United States Patent

Grajewski et al.

[11] Patent Number: 5,376,196
[45] Date of Patent: Dec. 27, 1994

[54] METHOD FOR SEALING THE END OF A HEAT-SHRUNK SLEEVE

[75] Inventors: Franz Grajewski, Stadthagen; Reinhard Schöttker, Lauenhagen, both of Germany

[73] Assignee: kabelmetal electro GmbH, Germany

[21] Appl. No.: 84,572

[22] Filed: Jun. 29, 1993

Related U.S. Application Data

[63] Continuation of Ser. No. 883,310, May 14, 1992, abandoned.

[30] Foreign Application Priority Data

Jul. 11, 1991 [DE] Germany .............................. 4122946

[51] Int. Cl.$^5$ ............................................ H01B 13/22
[52] U.S. Cl. .............................. 156/85; 156/47; 156/86; 264/342 R
[58] Field of Search .................... 156/47, 49, 85, 86; 264/342 R

[56] References Cited

U.S. PATENT DOCUMENTS

| | | | |
|---|---|---|---|
| 3,379,218 | 4/1968 | Conde | 138/99 |
| 3,455,336 | 7/1969 | Ellis | 138/156 |
| 4,085,286 | 4/1978 | Horsma et al. | 174/92 |
| 4,123,047 | 10/1978 | Koht et al. | 269/238 |
| 4,298,415 | 11/1981 | Nolf | 156/85 |
| 4,344,909 | 8/1982 | De Blauwe | 264/230 |
| 4,400,579 | 8/1983 | Nolf | 174/84 R |
| 4,410,379 | 10/1983 | Franckx | 156/54 |
| 4,490,426 | 10/1984 | Franckx | 428/99 |
| 4,560,828 | 10/1985 | Franckx et al. | 174/71 R |
| 4,625,073 | 11/1986 | Bresch et al. | 174/72 R |
| 4,641,009 | 2/1987 | Vansant et al. | 219/200 |
| 4,641,402 | 2/1987 | Vansant et al. | 24/304 |
| 4,648,924 | 3/1987 | Nolf | 156/85 |
| 4,680,065 | 7/1987 | Vansant et al. | 156/49 |
| 4,689,474 | 8/1987 | Overbergh et al. | 219/528 |
| 4,734,543 | 3/1988 | Nolf | 174/88 R |
| 4,860,799 | 8/1989 | Van Noten | 138/167 |
| 4,950,343 | 8/1990 | Shimirak et al. | 156/86 X |

FOREIGN PATENT DOCUMENTS

| 2413623 | 2/1975 | Germany . |
| 9100359 | 4/1991 | Germany . |

OTHER PUBLICATIONS

Raychem Corporation's Article Entitled: Thermofit Tubing Splice Encapsulation Directions; 1968.
XAGA 250 Distribution Splice Closure System.
Raychem Telecom Product Directory 1990–1991.
Kabelmetal Electro Pexolan ® Products.
XAGA 1600 Buried Splice Closure Polyurethane Encapsulated Method.
Raychem Thermofit ATUM Dual Wall Heat Shrinkable Tubing.
Raychem Telecom Product Directory 1989.

Primary Examiner—Caleb Weston
Assistant Examiner—Francis J. Lorin
Attorney, Agent, or Firm—Ware, Fressola, Van Der Sluys & Adolphson

[57] ABSTRACT

A method including using a device for sealing the end of a heat-shrunk sleeve enclosing a branch connection of electrical or optical cables which grips the outside surface of the sleeve between the branched cables and keeps the opposing surface areas of the sleeve between the cables in contact with each other during cooling of the heat-shrunk sleeve. The device has two identical preformed parts. Each part has a foot part and an arm extending in a semicircle from the foot part. The foot part has at least one peg and one bore, through which the preformed parts can be joined to form the device. The arms encircle one of the branched cables and the free ends of the arms grip the sleeve between the branched cables.

20 Claims, 2 Drawing Sheets

METHOD FOR SEALING THE END OF A HEAT-SHRUNK SLEEVE

This is a continuation of copending application Ser. No. 07/883,310 filed May 14, 1992 abandoned.

BACKGROUND OF THE INVENTION

1. Field of the Invention

The invention relates to a device for sealing the end of a heat-shrunk sleeve enclosing a branch connection of electrical or optical cables. The device grips the outside of the sleeve between the cable branches and keeps opposing parts of the sleeve between the cables in contact with each other while they cool following heat shrinking of the sleeve.

2. Description of the Prior Art

A pamphlet from the Raychem Company entitled "Thermofit Tubing Splice Encapsulation Directions" introduces a technique whereby the ends of two cables are inserted into a shrinkable sleeve. The inside of the shrinkable sleeve is coated with hot-melt adhesive. While the sleeve is hot, the area of the bushing between the cables is clamped together with a pliers-type tool. The hot-melt adhesive liquefies during the shrinking, and is forced into the empty spaces by the shrinking sleeve. The tool can be removed after the branch connection has cooled. After cooling, the hot-melt adhesive keeps the opposing areas between the cables together and seals the inlet area. The shape of the pliers-type tool is disclosed as needle-nosed.

U.S. Pat. No. 4,298,415 describes a clamp, instead of the pliers-type tool, which is pushed from the end of the bushing toward the inlet area of the bushing between the cables. In a preferred configuration, a three-legged metal clamp is used, one leg of which is located inside the sleeve, while the other two are outside. The leg on the inside of the sleeve is coated with hot-melt adhesive. During heat shrinking, heat is transmitted by the metal clamp to the inside of the sleeve, where it liquefies the hot-melt adhesive. The technique was used successfully to produce sleeves for communication cables. The use of this well known clamp is particularly difficult when the end of the sleeve is not easily accessible. In addition, the installer needs both hands, since installation of the clamp requires the inlet area to be squeezed together. Certain precautions must be taken to prevent the clamp from coming off the sleeve during heat shrinking, and increases the clamp's manufacturing costs. Thus, it is known to provide the clamp with a saw tooth profile, or to manufacture the clamp from a heat restoring alloy.

DE-GM 9,100,359 describes a tool with which the end of the sleeve located between the cable branches can be squeezed together before, during or after heat shrinking. This pliers-type tool is made of metal wire. Clamping pressure is provided by a spring. In the same manner as described earlier, the tool according to DE-GM 9,100,359 is also inserted at the end of the sleeve, i.e. sufficient space must be provided between the cable branches to manipulate the clamp or the tool.

SUMMARY OF THE INVENTION

An object of the invention is to provide a simple device for permanently sealing the end of a heat-shrunk sleeve, which encloses a branch connection of cables. It should not be necessary to spread the cable branches. The device should be simple to install, even under narrow space conditions.

This object is fulfilled by a device containing two identical preformed parts with a foot part and an arm extending in a semicircle from the foot. Each foot has at least one peg and/or one bore, through which the preformed parts can be joined to form the device with the arms encircling one of the branched cables, and the free ends of the arms gripping the sleeve between the branched cables. In the simplest configuration, the preformed parts have at least one bore in the foot part, preferably a pocket bore. The preformed parts are then joined by a separate peg, which is inserted into the bores of the preformed parts to form the device.

If the bores and pegs have rectangular cross sections, they are of special advantage since this makes guiding the preformed parts towards each other possible and prevents reciprocal twisting. In practice, the rectangular bores are only confined by three walls whereby lateral access to the bores is possible. In this fashion, the bores can be undercut, as provided in a further development of the invention, to connect with respective undercuts in the pegs, for a snap fit. A further advantage is for the peg to have a longitudinal slot at least along part of its length, allowing the peg to spring back after insertion into the bore. To increase the rigidity of the arm, it was proven advantageous to place a reinforcing rib on the outside surface of the arm. The preformed parts are preferably plastic injection molded parts. Injection molding permits the preformed parts to be cost effectively produced in large numbers. Materials such as polyamide, polyvinyl chloride, polyethylene, polypropylene, and also polycarbonate and phenol resin based molding compounds proved to be suitable.

BRIEF DESCRIPTION OF THE DRAWINGS

The invention will now be explained in greater detail by means of the following Figures of the drawings.

DETAILED DESCRIPTION OF INVENTION

Figure 1:
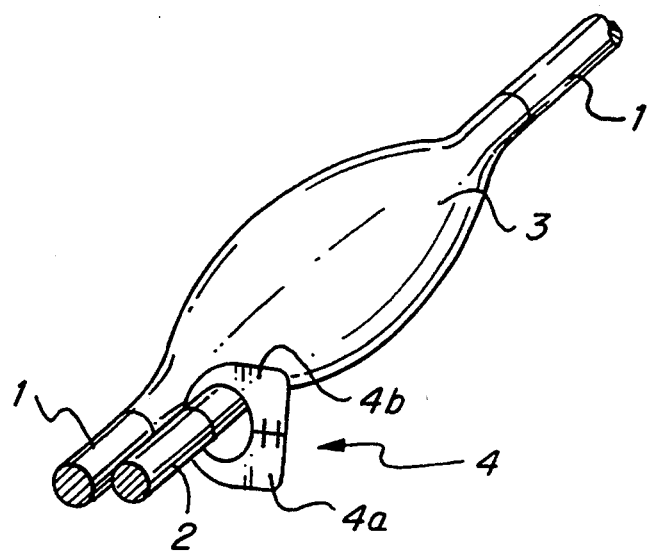
FIG. 1 is a perspective view of an electrical cable branch connection with the sealing device of the present installed thereon.
Figure 2:
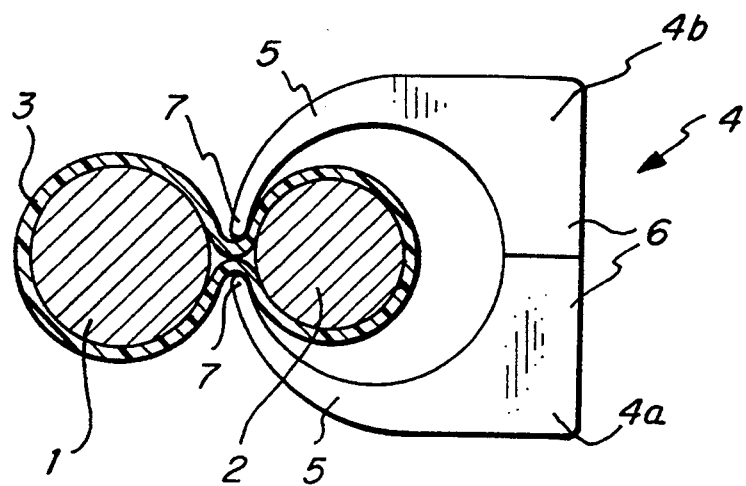
FIG. 2 is a cross-sectional view of the branch connection with the sealing device of the present installed thereon.

In FIG. 1, number 1 denotes an electrical cable from which cable 2 branches off. The branch area is enclosed by a heat-shrunk sleeve 3, which, although not shown, represents the known manner of closing a sheet of plastic heat shrinkable material by means of a rail along the longitudinal edge thereof. The inlet or outlet area of the sleeve 3 between cables 1 and 2 is sealed by a device 4, which is formed by interlocking two preformed parts 4a and 4b. As shown in FIG. 2, the device 4 grips cable 2 with its arms 5. The interlocking of preformed parts 4a and 4b takes place in the area of the foot parts 6, which will be explained in more detail in FIG. 3. When the preformed parts 4a and 4b are joined to form device 4, the free ends 7 of the arms 5 are located on the external surface of sleeve 3 and form it in such a way, that the opposing surfaces of sleeve 3 touch each other in the formed area between cables 1 and 2. The distance between the two free ends 7 is about twice the wall thickness of sleeve 3 in the shrunk condition. The device 4 may be placed on the end of sleeve 3 before, during or after the shrinking, but it is important for the sleeve 3 to still be hot, i.e. the hot-melt adhesive on the inside surface of sleeve 3 must still be liquid, so that all empty spaces are filled. Depending on the diameter of cables 1 and 2, the length of the free ends 7 on the cables is 50–100 mm, and the length of the foot part is about 25–50 mm.

Figure 3:
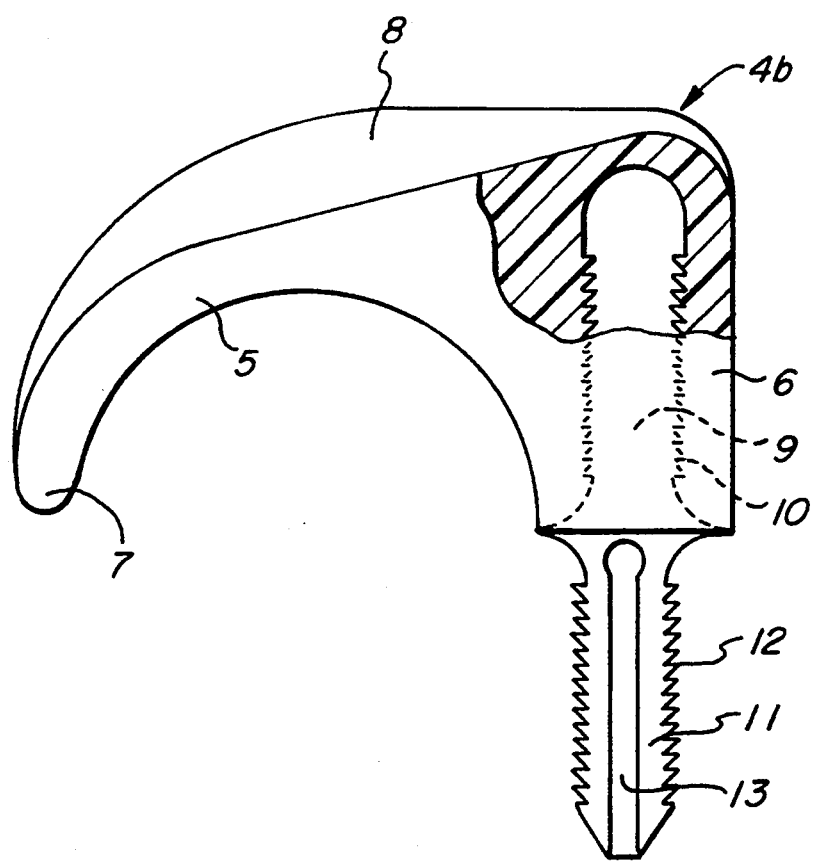
FIG. 3 is a side elevational view of the preformed part with a portion broken away to show internal structure.

The preformed part according to the invention is shown in FIG. 3. The arm is reinforced by a rib 8, which extends from the foot part 6 to the free end 7 of arm 5. The height of the rib 8 rises from both the free end 7 and from the foot part 6, and reaches its maximum about the middle.

The foot 6 of the preformed part (4a, 4b) contains a bore 9 with undercuts 10.

Adjacent to the bore 9, a peg 11 protrudes from the foot part 6, whose size is designed so that the peg 11 of one preformed part 4a can be inserted into the bore 9 of preformed part 4b, where it is held securely. To that effect peg 11 also has undercuts 12, which interlock with the undercuts 10 of bore 9 when the preformed parts 4a and 4b are inserted into each other. Peg 11 has a longitudinal slot 13 to aid in this arrangement. The bore 9 and peg 11 preferably have rectangular cross-sections.

Preformed parts 4a and 4b are completely identical and can be produced at low cost by the plastic injection molding process. However, it is also possible to injection mold the preformed parts 4a or 4b without the pegs 11. In that event, it would be advisable to make two bores 9 next to each other in the foot part 6, and subsequently insert separately manufactured elements, each having pegs 11 extending therefrom in opposite directions, into the bores 9.

Thus, it can be seen from the foregoing specification and attached drawings that the present invention provides an effective means for establishing intimate contact of the heat shrinkable material in the area between two closely adjacent members during a heat sealing operation.

The preferred embodiment admirably achieves the objects of the present invention; however, it should be appreciated that departures can be made by those skilled in the art without departing from the spirit and scope of the invention which is limited only by the following claims.

What is claimed is:

1. A method for sealing an end of a heat-shrunk sleeve enclosing a branch connection of electrical or optical cables, comprising the steps of:
   (a) providing at least two cables having a branch connection therebetween;
   providing a sleeve over the branch connection; and
   (c) providing a device which grips the sleeve between the cables, and keeps opposing surfaces of the sleeve between the cables in contact with each other during cooling of the sleeve following heat shrinking thereof, the device comprising first and second preformed parts, each preformed part having a foot part and an arm extending in a semi-circle from the foot part, the foot part of the first preformed part has at least one peg and the foot part of the second preformed part has at least one bore dimensionally sized to accept the at least one peg in mating relationship, whereby the preformed parts are joined to each other so that the arms encircle one of the cables, and free ends of the arms spaced from the foot parts grip the sleeve between the cables.

2. A method according to claim 1, wherein each of the at least one bore and the at least one peg have undercuts, which interlock with each other when the preformed parts are joined to each other.

3. A method according to claim 2, wherein the at least one peg has at least one slot along its length.

4. A method according to claim 3, wherein an outside surface of the arm of each preformed part has a reinforcing rib.

5. A method according to claim 4, the preformed parts are injection molded parts.

6. A method according to claim 5, wherein the at least one peg and the at least one bore each have rectangular cross-sectional shape.

7. A method according to claim 1, wherein the at least one peg has at least one slot along its length.

8. A method according to claim 1, wherein an outside surface of the arm of each preformed part has a reinforcing rib.

9. A method according to claim 1, wherein the preformed parts are injection molded parts.

10. A method according to claim 1, wherein the at least one peg and the at least one bore each have rectangular cross-sectional shape.

11. A method according to claim 1, wherein the first and second preformed parts are formed of a plastic resin material.

12. A method according to claim 1, wherein the foot part of the second preformed part has at least one peg and the foot part of the first preformed part has at least one bore dimensionally sized to accept the at least one peg of the second preformed part in mating relationship, whereby the preformed parts can be joined to each other so that the arms encircle one of the cables and the free ends of the arms grip the sleeve between the cables.

13. A method according to claim 12, wherein each of the at least one bore and the at least one peg have undercuts, which interlock with each other when the preformed parts are joined to each other.

14. A method according to claim 12, wherein the first and second preformed parts are identical in shape.

15. A method according to claim 12, wherein an outside surface of the arm of each preformed part has a reinforcing rib.

16. A method according to claim 12, wherein the preformed parts are injection molded parts.

17. A method according to claim 12, wherein the first and second preformed parts are formed of a plastic resin material.

18. A method according to claim 1, wherein the device providing step is performed before heat shrinking of the sleeve.

19. A method according to claim 1, wherein the device providing step is performed during heat shrinking of the sleeve.

20. A method according to claim 1, wherein the device providing step is performed after heat shrinking of the sleeve.

* * * * *

UNITED STATES PATENT AND TRADEMARK OFFICE
CERTIFICATE OF CORRECTION

PATENT NO. : 5,376,196
DATED : December 27, 1994
INVENTOR(S) : FRANZ GRAJEWSKI and REINHARD SCHÖTTKER It is certified that error appears in the above-indentified patent and that said Letters Patent is hereby corrected as shown below:

In column 3, line 52, before "providing",
--(b)-- should be inserted.

Signed and Sealed this

Twenty-eight Day of March, 1995

Attest:

BRUCE LEHMAN

*Attesting Officer*     *Commissioner of Patents and Trademarks*